Aug. 27, 1968  R. T. COWAN, JR., ET AL  3,398,570
PRESSURE GAUGE FIELD TESTING METHOD AND APPARATUS
Filed Jan. 17, 1966
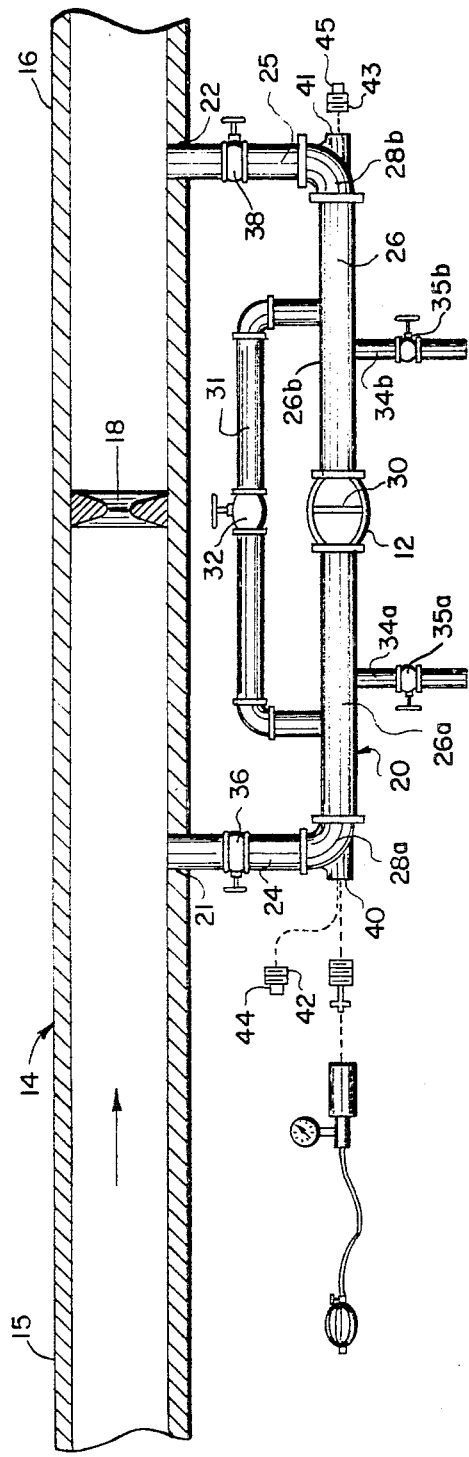
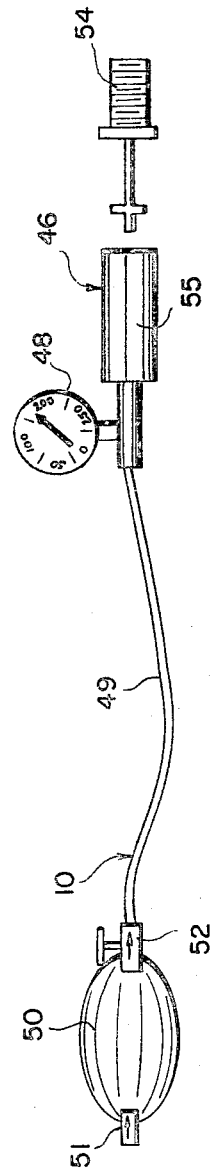
INVENTORS.
RICHARD T. COWAN JR.
RICHARD T. COWAN SR.

United States Patent Office 3,398,570
Patented Aug. 27, 1968

3,398,570
PRESSURE GAUGE FIELD TESTING METHOD
AND APPARATUS
Richard T. Cowan, Jr., Rte. 2, Box 27, Talahi Isle 31404,
and Richard T. Cowan, Sr., 323 E. 50th St. 31405,
both of Savannah, Ga.
Filed Jan. 17, 1966, Ser. No. 520,979
6 Claims. (Cl. 73—4)

ABSTRACT OF THE DISCLOSURE

A pressure gauge testing method and apparatus utilized in the field to calibrate pressure gauges attached to flow lines at remote positions. The method comprises isolating a pressure gauge from its flow line without removing it from the flow line, exposing both sides of the pressure sensitive element of the gauge to the atmosphere, increasing the air pressure on one side of the pressure sensitive element, and comparing the gauge reading with a previously calibrated gauge. The apparatus comprises a U-shaped conduit having the ends of its legs in communication with a flow line on opposite sides of a constriction in the flow line, a pressure gauge in the conduit, valves for isolating the conduit from the flow line and opening the conduit to the atmosphere, and a precalibrated pressure gauge and collapsible air bulb connectable to the conduit.

---

It is common practice to utilize very accurate pressure transmitters in the flow lines of chemical process plants so that accurate measurement of the flows or pressures maintained in the flow lines could be calculated. Of course, this requires an accurate measuring device and frequent tests of the measuring device to insure that its accuracy is maintained. Furthermore, due to the fact that such a transmitter is commonly utilized with a chemical that is detrimental to the particular parts of the transmitter with which it comes into contact, frequent disassembly and cleaning of some transmitters is required. Of course, when the transmitter is disassembled, cleaned, and then reassembled, it must be reset or calibrated in order to accurately measure the flow or pressures in the flow line.

Because of the delicacy of the pressure transmitters in such a flow system, it has been common practice to remove the pressure transmitters from the flow system and take them to a remote testing station where elaborate, complicated, and reliable testing apparatus was utilized to test the transmiters. After the transmitters were tested, they had to be carried back to their location of use and reassembled with the flow line. Upon reassembling the transmitters, the operator subjected the transmitters to whatever forces or vibrations that would normally be encountered by their reassembly with the system. Of course, this is occasionally detrimental to the setting or calibration of a transmitter so that after the transmitter is reassembled, it will not accuratley indicate the flow or pressure within the flow system.

As an alternative to the above stated method of testing the transmitters of chemical flow systems, there have been instances when the operator attempting to test such a transmitter would transport the testing apparatus to the vicinity of the transmitter and attempt to test the transmitter at its location in the flow line of the system. This method of testing the transmitter caused the operator to transport the expensive testing equipment, which usually comprised two monometers which read in inches of water or inches of mercury, and due to the high pressures maintained in the flow system, were quite tall, cumbersome and delicate. Furthermore, while some of the elements of the pressure transmitters were not required to be disconnected from its associated components in the remaining portion of the system, several portions of the transmitter were required to be disassembled so that the hazard encountered in reassembling the transmitter was not completely obviated.

Accordingly, this invention comprises a convenient and inexpensive method and apparatus for testing a differential pressure transmitter of a chemical flow system whereby the pressure transmitter is mounted in communication with conduits adapted to have different fluid pressures therein and between which the pressure difference is desired to be calculated, the conduits having appropriate valves to selectively close the communication therefrom to the pressure transmitter and secondary valves to drain the pressure transmitter so that it is subjected only to atmospheric pressure, and means for subjecting one side of the differential pressure transmitter to a selected pressure, whereupon the indicating means of the differential pressure transmitter can be accurately set to indicate the exact pressure encountered by its pressure sensing means.

Thus, it is an object of this invention to provide a method of testing a differential pressure transmitter that does not require the removal of the transmitter from its fluid flow system, and which requires only a minimum of effort and equipment, yet provides an accurate and reliable test of the pressure transmitter while removing the hazards encountered by the disassembly and reassembly of the transmitter.

Another object of this invention is to provide apparatus for connection to a differential pressure transmitter that is capable of simply and accurately measuring the accuracy of such a transmitter.

Another object of this invention is to provide a method and apparatus for testing a differential pressure transmitter, the method being simple and economical to perform, and the apparatus being simple in construction and well designed to meet the economics of manufacture.

Other objects, features and advantages of the present invention will become apparent upon reading the following disclosure, taken in conjunction with the accompanying drawing, in which:

FIG. 1 is a schematic view of the apparatus utilized to calibrate the pressures subjected to the pressure sensitive element of a differential pressure transmitter; and FIG. 2 is a schematic view, with some parts shown in cross section, of the arrangement of a differential pressure transmitter when it is connected to a flow line, and the method of attaching the calibrating device of FIG. 1 thereto.

Referring now more particularly to the drawing, in which like numerals indicate like parts throughout the several views, the pressure gauge tester 10 is utilized to test the differential pressure transmitter of a flow line, such as the pressure gauge or transmitter 12 in the flow line 14. The flow line 14 has a low pressure end 15 and a high pressure end 16 with a constriction 18 located therebetween. While the flow line 14 is shown with a simple constriction 18, it should be understood that the constriction 18 merely creates a pressure drop from the high pressure side 15 toward the low pressure side 16 of the flow line 14. Of course, the constriction 18 can be in the form as shown in FIG. 2 or it can be of any form that would dissipate the pressure from the high pressure side of the flow line 14 toward its low pressure side, such as a motor, nozzle, cooling coils, or venturi, but in no way is restricted to these few examples. Furthermore, the differential pressure transmitter can be connected between completely separate flow lines.

An auxiliary conduit 20 is connected to the flow line 14 at points 21 and 22, in the high pressure and low pressure portions 15 and 16, respectively, of the flow line 14. The auxiliary conduit comprises branch conduits 24 and 25 connected to the high pressure and low pressure portions 15 and 16, respectively, at points 21 and 22 of the flow line and a parallel conduit 26 having portions 26a and 26b is connected to the branch conduits 24 and 25, respectively, by way of the elbow connections 28a and 28b. The parallel conduit 26 has its portions 26a and 26b connected to either side of a differential pressure gauge 12 so that the pressure gauge is subjected to the pressure of the fluid on either side of constriction 18 of the flow line 14.

The differential pressure transmitter 12, while being schematically shown in the drawing, is quite delicate and has a multitude of parts that are moved or otherwise effected by the pressure exerted on the diaphragm 30. When the diaphragm 30 moves to one side or the other because of the pressure exerted thereon by the fluid in the flow line 14, it actuates the conventional following mechanism that indicates the amount of movement thereof. Of course, the diaphragm 30 is of known size and the amount of force required to move it a given distance is predetermined so that when the following mechanism of the transmitter moves a corresponding distance, it is reflective of the amount of fluid pressure required to move a diaphragm its given distance. Accordingly, when the following mechanism is calibrated and is caused to travel over a scale, any movement of the diaphragm which is created from the difference in pressure in the fluid in the flow line from the high pressure portion 15 to the low pressure portion 16 can be visually determined by a person inspecting the following mechanism of the diaphragm 30.

The auxiliary conduit 20 further comprises a bypass branch 31 connected to the parallel conduit 26 on either side of the differential pressure transmitter 12. The by-pass branch 31 has a valve 32 adapted to open and close the by-pass branch. Of course, when the valve 32 is open, the portion 26a of the parallel conduit 26 is free to communicate with the portion 26b so that fluid communication can be maintained from the high pressure portion 15 of the flow line 14 through the branch 24, elbow connection 28a, portion 26a of the parallel conduit 26, through the by-pass branch 31 and its valve 32, through the portion 26b of the parallel conduit 26, through the elbow connection 26b through the branch 25, and to the low pressure portion 16 of the flow line 14. This path of flow would be effective to by-pass both the constriction 18 of the flow line and the differential pressure transmitter 12 of the parallel conduit 26.

Drain conduits 34a and 34b are connected to the portions 26a and 26b of the parallel conduit 26 on either side of the differential pressure transmitter 12. The opening of the conduits 34a and 34b is controlled by the valves 35a and 35b, respectively. Branch conduits 24 and 25 are controlled by the valves 36 and 38, respectively, so that flow can be maintained through the branch conduits 24 and 25 only when these valves are open.

The elbow connections 28a and 28b are constructed with access openings 40 and 41, respectively, and plugs 42 and 43 are threadably insertable into the access openings. Of course, when the plugs 42 and 43 are threaded into the openings 40 and 41, a fluid tight seal will be maintained so that none of the fluid from the flow line 14 will leak therethrough. However, the plugs 42 and 43 have noncircular projections 44 and 45 on one end thereof so that the plugs can easily be withdrawn from the elbow connections 28a and 28b when it is desirable to have access to the auxiliary conduit 20.

The pressure gauge testing apparatus 10 comprises a quick connecting plug assembly 46, a pressure gauge 48, a rubber hose 49 connected to the plug assembly and pressure gauge, a squeeze bulb 50, an inlet check valve 51 connected to the squeeze bulb 50, and a combination outlet check and needle bleed valve connected between the squeeze bulb 50 and the rubber hose 49. With this construction it can be seen that when the operator of the pressure gauge testing apparatus repeatedly squeezes the squeeze bulb 50, the check valve 51 will allow air to enter the squeeze bulb while the check and needle bleed valve 52 will allow the air inside the squeeze bulb to escape to the rubber hose 49. Of course, when the quick connecting plug assembly 46 is connected to a chamber, the chamber will be filled with air as the squeeze bulb 50 is repeatedly squeezed. When the operator desires to empty such a chamber, the combination check and needle bleed valve 52 can merely be adjusted so that the air from the rubber hose 49 be allowed to escape therethrough to the atmosphere.

The quick connecting plug assembly 46 comprises a hollow plug 54 adapted to be threadably received in the openings 40 and 41 of the elbow connections 28a and 28b, and the female connection 55 which is attachable to the hollow plug 54.

OPERATION

When it is desired to operate the differential pressure transmitter normally, so that the pressure transmitter indicates the difference between the pressure of the fluid in the flow line on its high pressure portion 15 from its low pressure portion 16, the drain valves 35a and 35b are closed, the valve 32 of the by-pass 31 is closed, the plugs 44 and 45 are inserted in the openings 40 and 41 of the elbow connections 28a and 28b, respectively, and the valves 36 and 38 of the branch conduits 24 and 25 are opened. With this arrangement it can be seen that the fluid from the flow line 14 is free to communicate with the branch lines 24 and 25 on each side of the constriction 18, but since the plugs are inserted in their openings and all the other valves of the auxiliary conduit 20 are closed, there is no escape route for the fluid. Accordingly, the pressure inside the flow line on each side of the constriction 18 will be felt in the auxiliary conduit 20, the pressure from the high pressure portion 15 being felt in the portion 26a of the parallel conduit 26 and the pressure from the low pressure portion 16 of the flow line being felt in the portion 26b of the parallel conduit 26. Since the diaphragm 30 of the differential pressure transmitter communicates with both portions 26a and 26b of the parallel conduit 26, the diaphragm will be moved a predetermined amount by a given pressure so that a follower mechanism will indicate the pressure exerted on the diaphragm.

When it is desired to calibrate the differential pressure transmitter, the valves 36 and 38 of the branch conduits 24 and 25 are closed to isolate the auxiliary conduit 20 from the flow line 14. The by-pass branch valve 32 is then opened to equalize the pressures of the fluids in portions 26a and 26b of parallel conduit 26, and the drain valves 35a and 35b of the drain conduits 34a and 34b, respectively, are opened to drain the liquid from the parallel conduit 26 and the by-pass branch 31. The plugs 42 and 43 of the elbow connections 28a and 28b are removed whereupon the auxiliary conduit 20 is opened at four places, at openings 40 and 41, and through the drain conduits 34a and 34b. Of course, opening the valves and removing the plug 42 completely drains the fluid from the auxiliary conduit 20, and opening the valve 32 of the by-pass branch 31 equalizes the pressure on either side of the diaphragm 30 of the differential pressure transmitter 12. When the pressure on the diaphragm 30 is equalized, the quick connecting plug assembly 46 is connected to the elbow connection 28a by threading the plug 54 into the opening 40 and connecting the female portion 55 to the hollow plug 54. The valve 35a of the drain conduit 34a is then closed and the valve 32 of the by-pass branch 31 is also closed. This isolates the portion 26a of the parallel conduit 26 from the atmosphere and from the flow line 14, while the portion 26b of the parallel conduit 26 remains open to the atmosphere, the diaphragm 30 being in a neutral or "zero" position.

The needle valve of the check and needle valve 52 of the pressure gauge testing apparatus 10 is then closed and the operator repeatedly squeezes the bulb 50 to pump air from the squeeze bulb through its rubber hose 49 into the portion 26a of the parallel conduit 26, adjacent the high-pressure side of the diaphragm 30. Of course, since the pressure on the side of the diaphragm 30 adjacent the portion 26a of the parallel conduit 26 is higher than on that side of the diaphragm 30 adjacent the portion 26b of the parallel conduit 26, the diaphragm 30 will flex or move toward the low pressure, which is atmospheric pressure, so that its following mechanism will indicate the difference between the pressure in the portion 26a and the portion 26b of the parallel conduit 26, or the difference between the pressure created in portion 26a and atmospheric pressure. Since the portion 26a of the parallel conduit 26 communicates freely with the pressure gauge testing apparatus, through the quick connecting plug assembly 46 and the rubber tube 49 to the check and needle valve 52, the pressure gauge 48 of the pressure gauge testing apparatus will also indicate the pressure of the fluid in the portion 26a, which will also be the difference between the pressure created in the portion 26a and atmospheric pressure. Of course, the pressure indicated on the pressure gauge 48 will be identical to the pressure indicated by the following mechanism of the diaphragm 30 of the differential pressure transmitter 12. If there is a difference between the pressure indicated by the pressure gauge 48 and that indicated by the differential pressure transmitter 12, the operator can adjust the differential pressure transmitter until it agrees with the indication of the pressure gauge 48 of the testing apparatus 10.

After the operator has adjusted the differential pressure transmitter 12, the needle valve of the check and needle bleed valve 52 can be opened to slowly relieve the pressure from the portion 26a of the parallel conduit 26 and follow the travel of the indicating means of the two gauges for comparison purposes.

After the calibration of the differential pressure transmitter 12 is complete, the quick connecting plug assembly can be removed from the elbow connection 28a and the plugs 42 and 43 reinserted into the openings 40 and 41. Since the valves 32 and 35a have already been closed, the valves 35b can be closed and valves 36 and 38 of the branch conduits 24 and 25 can be reopened so that the flow line 14 can communicate with the auxiliary conduit 20 and the differential pressure transmitter 12, as previously described.

While the pressure gauge testing apparatus 10 has been disclosed as being insertable into the high pressure end of the auxiliary conduit 20 with the low pressure end of the auxiliary conduit being open to the atmosphere, it should be understood that pressure gauge testing apparatus can be inserted into both ends of the auxiliary conduit at the elbow connections 28a and 28b, and a pressure created in the portion 26a of the parallel conduit 26 that is higher than the pressure created in the portion 26b of the parallel conduit 26. In this manner, the operator merely reads the pressure indicated on the pressure gauge 48 of the testing apparatus 10 on the high pressure side of the auxiliary conduit 20 and subtracts therefrom the pressure indicated on the pressure gauge 48 of the testing apparatus 10 connected to the low pressure end of the auxiliary conduit 20. Of course, the difference betwen the pressures of the testing apparatus should be identical to that indicated by the differential pressure transmitter 12. If the differential pressure transmitter 12 does not agree with the difference between the pressure gauges 48 of the testing apparatus, the differential pressure transmitter 12 can be adjusted as previously described so that it gives a true reading.

With the foregoing construction and procedure, it can be seen that the pressure gauge testing apparatus and method is extremely simple in construction and operation. Heretofore, it has been thought necessary to utilize monometers of extended length to get accurate readings on the pressure present on each side of the differential pressure transmitter since the reliability of a gauge such as those utilized in the present invention was questionable. However, the fact that the pressure testing apparatus of the present invention is so mobile and easily handled makes it adaptable to frequent testing to insure that it is accurate. For instance, when the operator wishes to test a differential pressure transmitter such as that shown with the flow line 14, he can merely test his testing apparatus at a central location to precisely calibrate the pressure gauge 48 at the particular pressure differential at which the flow lines of the system usually operates. If the flow lines usually operate at a pressure differential of 200 inches of water, the testing apparatus can be tested with the more reliable equipment located in a testing lab to insure that an accurate reading will be maintained on the smaller testing equipment at the given pressure of 200 inches of water.

The operator then merely takes the testing apparatus to the location of the differential pressure transmitter and runs his test as described above and creates a pressure in the portion 26a of the parallel conduit 26 of 200 inches of water while the portion 26b of the parallel conduit 26 is open to the atmosphere. Of course, the differential pressure transmitter 12 should also indicate a pressure of 200 inches of water if it is properly calibrated. When the operator has completed his test and replaced the plugs and opened the appropriate valves of the auxiliary conduit 20, he can return to the lab and retest his testing apparatus to insure that the pressure gauge 48 thereof is still accurately calibrated. Of course, if the next differential pressure transmitter to be tested normally operates at a different pressure range, the operator can test the pressure gauge 48 of his testing apparatus in the appropriate pressure range before and after making the tests of the differential pressure transmitter to insure the accuracy of his tests.

With this arrangement, it can be seen that the differential pressure transmitter of a flow line need not be removed from its original location while being accurately and conveniently tested by a reliable testing apparatus. Furthermore, the testing apparatus utilized to test the differential pressure gauge is extremely simple in construction and operation and economical to manufacture and maintain. Furthermore, a plurality of testing apparatus can be manufactured and maintained at a low expense so that a plurality of differential pressure transmitters located at different points in a complicated flow system can be simultaneously measured by a plurality of operators. Of course, only a single monometer of the type previously employed in such tests is required, even though a plurality of simultaneous tests can be made with the instant invention.

It will be obvious to those skilled in the art that many variations may be made in the embodiments chosen for the purpose of illustrating the present invention without departing from the scope thereof as defined by the appended claims.

We claim:

1. A method of calibrating a differential pressure gauge of a fluid flow system wherein the gauge is of the type including a pressure responsive element arranged to be subjected on opposite sides thereof to varying fluid pressures and including a following mechanism to indicate the difference between the pressures, the steps of,
    isolating both sides of the pressure responsive element from the fluid flow system without removing the gauge from the fluid flow system or interrupting the flow of fluid through the fluid flow system,
    communicating both sides of the pressure responsive element with the atmosphere to position the pressure responsive element in its neutral position,
    closing one side of the pressure responsive element from the atmosphere, increasing the air pressure against said one side of the pressure responsive element, measuring the air pressure on said one side of the pressure responsive element, and setting the following mechanism of the differential pressure gauge to correspond with the air pressure on said one side of the pressure responsive element.

2. A method of calibrating a differential pressure gauge as claimed in claim 1 and further comprising calibrating the pressure gauge of said testing apparatus before and after calibrating said differential pressure gauge.

3. The invention of claim 1 and further including the steps of:

closing the other side of the pressure responsive element from the atmosphere, increasing the air pressure against said other side of the pressure responsive element, measuring the air pressure on said other side of the pressure responsive element, and setting the following mechanism of the differential pressure gauge to correspond to the difference between the air pressure on said one side of the pressure responsive element and the air pressure on the said other side of the pressure responsive element.

4. The invention of claim 1 wherein the steps of increasing the air pressure against said one side of said pressure responsive element comprises repeatedly squeezing a squeeze bulb of the type having one way fluid flow therethrough.

5. The invention of claim 3 wherein the steps of increasing the pressures on opposite sides of pressure responsive element comprises repeatedly squeezing squeeze bulbs of the type having one way fluid flow therethrough and connected to opposite sides of said pressure responsive element.

6. In a flow system comprising a flow line including a restriction, a conduit connected to the flow line on opposite sides of the restriction, a pressure gauge connected to the conduit and including a pressure responsive member blocking the conduit and pressure indicating means connected to the pressure responsive member, and valve means for isolating the conduit from the flow line and opening the conduit on both sides of the pressure gauge to the atmosphere; the combination therewith of apparatus for calibrating the pressure gauge comprising a fitting connectable to the conduit on one side of the pressure responsive member, a flexible tube communicating at one of its ends with the fitting, a collapsible bulb communicating with the other end of the tube, valve means connected to the bulb and constructed to allow air to flow only into the bulb, a bleed valve connected to the bulb, and a pressure gauge communicating with the tube.

References Cited
UNITED STATES PATENTS

| | | | |
|---|---|---|---|
| 3,077,102 | 2/1963 | Green et al. | 73—4 |
| 3,120,118 | 2/1964 | Boyle | 73—3 |
| 3,262,305 | 7/1966 | Dawley | 73—4 |

DAVID SCHONBERG, *Primary Examiner.*

NEIL B. SIEGEL, *Assistant Examiner.*